(12) United States Patent
Park

(10) Patent No.: US 9,413,182 B2
(45) Date of Patent: Aug. 9, 2016

(54) SYSTEM AND METHOD FOR PERIODICALLY CHARGING SUB-BATTERY FOR AN ELECTRIC VEHICLE BASED ON THE SOC DISCHARGE RATE

(71) Applicant: Hyundai Motor Company, Seoul (KR)

(72) Inventor: Jun Yeon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 221 days.

(21) Appl. No.: 13/930,780

(22) Filed: Jun. 28, 2013

(65) Prior Publication Data

US 2014/0167680 A1 Jun. 19, 2014

(30) Foreign Application Priority Data

Dec. 18, 2012 (KR) .................. 10-2012-0148063

(51) Int. Cl.
*H02J 7/00* (2006.01)
*B60L 3/00* (2006.01)
(Continued)

(52) U.S. Cl.
CPC ............. *H02J 7/0054* (2013.01); *B60L 3/0015* (2013.01); *B60L 3/0046* (2013.01); *B60L 3/04* (2013.01); *B60L 11/1857* (2013.01); *B60L 11/1859* (2013.01); *B60L 11/1862* (2013.01); *B60L 11/1868* (2013.01); *B60L 2210/12* (2013.01); *B60L 2240/545* (2013.01); *B60L 2240/547* (2013.01); *B60L 2240/549* (2013.01); *B60L 2240/80* (2013.01); *B60L 2250/10* (2013.01); *Y02T 10/7005* (2013.01);
(Continued)

(58) Field of Classification Search
CPC ....................................... H02J 7/0054

USPC ................................... 320/103, 104
See application file for complete search history.

(56) References Cited

U.S. PATENT DOCUMENTS 2,347,514 A * 4/1944 Shively et al. ................ 361/164
3,652,917 A * 3/1972 Biggs ............................ 320/128
(Continued)

FOREIGN PATENT DOCUMENTS

JP 07111735 A * 4/1995 ................ H02J 7/00
JP 2006174619 * 6/2006
(Continued)

OTHER PUBLICATIONS

Battery Peformance Characteristics: Self-Discharge Characteristics, Electropaedia, MpowerUK, Published May 19, 2007, Accessed Mar. 11, 2015, https://web.archive.org/web/20070519025306/http://www.mpoweruk.com/performance.htm.*
(Continued)

*Primary Examiner* — Robert Grant
*Assistant Examiner* — John Trischler
(74) *Attorney, Agent, or Firm* — Mintz Levin Cohn Ferris Glovsky and Popeo, P.C.; Peter F. Corless

(57) ABSTRACT

Provided is a system method for periodically charging a sub-battery for an electric vehicle. In this method, an SOC self-discharge rate of the sub-battery is calculated. An LDC output voltage and a charging time of the sub-battery are set using the SOC self-discharge rate of the sub-battery and information received from an IBS. It is determined whether or not an SOC of a main battery is equal to or greater than a set value. Periodic charging is performed on the sub-battery through an operation of an LDC when the SOC of the main battery is equal to or greater than the set value.

11 Claims, 3 Drawing Sheets

(51) Int. Cl.
*B60L 11/18* (2006.01)
*B60L 3/04* (2006.01)
(52) U.S. Cl.
CPC ......... *Y02T 10/7044* (2013.01); *Y02T 10/7066* (2013.01); *Y02T 10/7216* (2013.01); *Y02T 10/7233* (2013.01)

(56) References Cited

U.S. PATENT DOCUMENTS

| | | | | |
|---|---|---|---|---|
| 3,740,636 | A * | 6/1973 | Hogrefe et al. | 320/101 |
| 4,320,346 | A * | 3/1982 | Healey, III | 329/352 |
| 4,377,787 | A * | 3/1983 | Kikuoka et al. | 324/431 |
| 4,461,693 | A * | 7/1984 | Jain | 204/635 |
| 4,540,929 | A * | 9/1985 | Binkley | 320/104 |
| 4,668,902 | A * | 5/1987 | Zeller, Jr. | 320/153 |
| 4,775,827 | A * | 10/1988 | Ijntema et al. | 320/132 |
| 4,803,416 | A * | 2/1989 | Abiven et al. | 320/132 |
| 4,808,858 | A * | 2/1989 | Stoops | 327/322 |
| 4,851,306 | A * | 7/1989 | Kaun et al. | 429/112 |
| 4,929,931 | A * | 5/1990 | McCuen | 340/636.15 |
| 4,961,043 | A * | 10/1990 | Koenck | 320/132 |
| 5,315,228 | A * | 5/1994 | Hess et al. | 320/106 |
| 5,325,040 | A * | 6/1994 | Bogut et al. | 320/150 |
| 5,341,503 | A * | 8/1994 | Gladstein et al. | 713/340 |
| 5,357,203 | A * | 10/1994 | Landau et al. | 324/427 |
| 5,363,031 | A * | 11/1994 | Miller et al. | 320/115 |
| 5,394,089 | A * | 2/1995 | Clegg | 324/427 |
| 5,440,221 | A * | 8/1995 | Landau et al. | 320/155 |
| 5,479,083 | A * | 12/1995 | Brainard | 320/121 |
| 5,490,053 | A * | 2/1996 | Tkacenko et al. | 363/15 |
| 5,514,946 | A * | 5/1996 | Lin et al. | 702/63 |
| 5,530,335 | A * | 6/1996 | Decker et al. | 320/102 |
| 5,561,362 | A * | 10/1996 | Kawamura et al. | 320/134 |
| 5,565,759 | A * | 10/1996 | Dunstan | 320/135 |
| 5,600,282 | A * | 2/1997 | Austin et al. | 331/111 |
| 5,659,240 | A * | 8/1997 | King | 320/134 |
| 5,668,461 | A * | 9/1997 | Hancock | H02J 7/0054 320/103 |
| 5,712,795 | A * | 1/1998 | Layman et al. | 700/297 |
| 5,714,277 | A * | 2/1998 | Kawakami | 429/62 |
| 5,739,670 | A * | 4/1998 | Brost et al. | 320/131 |
| 5,781,013 | A * | 7/1998 | Takahashi | 324/426 |
| 5,869,951 | A * | 2/1999 | Takahashi | 320/104 |
| 5,874,823 | A * | 2/1999 | Suzuki | 320/125 |
| 5,900,718 | A * | 5/1999 | Tsenter | 320/151 |
| 5,952,813 | A * | 9/1999 | Ochiai | 320/104 |
| 5,955,869 | A * | 9/1999 | Rathmann | 320/132 |
| 5,969,507 | A * | 10/1999 | Meyer | 320/137 |
| 5,982,148 | A * | 11/1999 | Mercer | 320/134 |
| 6,072,299 | A * | 6/2000 | Kurle et al. | 320/112 |
| 6,097,176 | A * | 8/2000 | Yao et al. | 320/132 |
| 6,137,264 | A * | 10/2000 | Downs et al. | 320/133 |
| 6,157,169 | A * | 12/2000 | Lee | 320/132 |
| 6,157,316 | A * | 12/2000 | Okayama et al. | 340/7.32 |
| 6,169,669 | B1 * | 1/2001 | Choudhury | 363/37 |
| 6,181,103 | B1 * | 1/2001 | Chen | 320/106 |
| 6,424,157 | B1 * | 7/2002 | Gollomp et al. | 324/430 |
| 6,646,419 | B1 * | 11/2003 | Ying | 320/132 |
| 6,789,026 | B2 * | 9/2004 | Barsoukov et al. | 702/63 |
| 6,828,761 | B1 * | 12/2004 | Suzuki et al. | 320/132 |
| 6,932,174 | B2 * | 8/2005 | Hirata et al. | 180/65.245 |
| 7,020,519 | B2 * | 3/2006 | Greatbatch | A61N 1/08 320/103 |
| 7,197,656 | B2 * | 3/2007 | Nguyen et al. | 713/340 |
| 7,477,038 | B2 * | 1/2009 | Taniguchi | 320/104 |
| 7,535,201 | B2 * | 5/2009 | Nakazawa | 320/133 |
| 8,332,342 | B1 * | 12/2012 | Saha et al. | 706/45 |
| 8,400,162 | B1 * | 3/2013 | Jannson et al. | 324/427 |
| 8,774,995 | B2 * | 7/2014 | Ishibashi | B60L 11/1809 180/65.1 |
| 2002/0025472 | A1 * | 2/2002 | Komori et al. | 429/118 |
| 2002/0051368 | A1 * | 5/2002 | Ulinski et al. | 363/1 |
| 2003/0184264 | A1 * | 10/2003 | Bertness | 320/137 |
| 2003/0226049 | A1 * | 12/2003 | Mantani | 713/322 |
| 2004/0162683 | A1 * | 8/2004 | Verbrugge et al. | 702/64 |
| 2005/0212484 | A1 * | 9/2005 | Denning et al. | 320/128 |
| 2006/0038532 | A1 * | 2/2006 | Taniguchi | 320/103 |
| 2006/0071553 | A1 * | 4/2006 | Lengacher et al. | 307/10.1 |
| 2006/0132092 | A1 * | 6/2006 | Hoffman et al. | 320/132 |
| 2006/0145658 | A1 * | 7/2006 | Wang | 320/107 |
| 2006/0255997 | A1 * | 11/2006 | Li et al. | 341/156 |
| 2007/0159137 | A1 * | 7/2007 | Verbrugge et al. | 320/132 |
| 2007/0216372 | A1 * | 9/2007 | Weng et al. | 323/222 |
| 2007/0252435 | A1 * | 11/2007 | Coe et al. | 307/10.1 |
| 2007/0257642 | A1 * | 11/2007 | Xiao et al. | 320/134 |
| 2008/0278115 | A1 * | 11/2008 | Huggins | 320/134 |
| 2009/0251151 | A1 * | 10/2009 | Miyashita | 324/426 |
| 2010/0261043 | A1 * | 10/2010 | Kim et al. | 429/61 |
| 2011/0043040 | A1 * | 2/2011 | Porter et al. | 307/66 |
| 2011/0133694 | A1 * | 6/2011 | Song | 320/109 |
| 2011/0279079 | A1 * | 11/2011 | Do Valle et al. | 320/107 |
| 2011/0291610 | A1 * | 12/2011 | Kamiya et al. | 320/103 |
| 2011/0298417 | A1 * | 12/2011 | Stewart et al. | 320/107 |
| 2011/0298624 | A1 * | 12/2011 | Bauman et al. | 340/636.1 |
| 2012/0062182 | A1 * | 3/2012 | Rimdzius et al. | 320/155 |
| 2012/0089286 | A1 * | 4/2012 | Nakata | 701/22 |
| 2012/0130558 | A1 * | 5/2012 | Yoshimura | 700/297 |
| 2012/0223670 | A1 * | 9/2012 | Kinjo et al. | 320/103 |
| 2012/0299377 | A1 * | 11/2012 | Masuda et al. | 307/10.1 |
| 2013/0222026 | A1 * | 8/2013 | Havens | 327/158 |
| 2013/0307480 | A1 * | 11/2013 | Boggs et al. | 320/118 |
| 2014/0225573 | A1 * | 8/2014 | Watanabe et al. | 320/155 |
| 2014/0375265 | A1 * | 12/2014 | Koyama et al. | 320/109 |

FOREIGN PATENT DOCUMENTS

| | | |
|---|---|---|
| JP | 2007137275 A | 6/2007 |
| JP | 2010200531 A | 9/2010 |
| JP | 2010213556 A | 9/2010 |
| JP | 2011111032 A | 6/2011 |
| KR | 10-2006-0000647 | 1/2006 |
| KR | 10-2010-0085791 | 7/2010 |
| KR | 10-2012-0012660 | 2/2012 |
| KR | 10-2012-0083066 A | 7/2012 |

OTHER PUBLICATIONS

CN203491765U, abstract, Published Mar. 19, 2014, Accessed Mar. 16, 2014, Derwent Database.*
JP406253465A, abstract, Published Sep. 9, 1994, Accessed Mar. 16, 2014, JPO Database.*
WO 2010005052 A2, abstract, Published Jan. 14, 2010, Accessed Mar. 16, 2014, Derwent Database.*
State of Health (SOH) Determination, Electropaedia, Mpower, Published May 11, 2008, Accessed Mar. 16, 2015, https://web.archive.org/web/20080511160803/http://www.mpoweruk.com/soh.htm.*
"State of Charge Determination," Electropaedia, mpoweruk, Published May 9, 2008, Accessed Apr. 2, 2015, http://web.archive.org/web/20080509145838/http://www.mpoweruk.com/soc.htm.*

* cited by examiner

SYSTEM AND METHOD FOR PERIODICALLY CHARGING SUB-BATTERY FOR AN ELECTRIC VEHICLE BASED ON THE SOC DISCHARGE RATE

CROSS-REFERENCE TO RELATED APPLICATION

This application claims under 35 U.S.C. §119(a) the benefit of Korean Patent Application No. 10-2012-0148063 filed Dec. 18, 2012, the entire contents of which are incorporated herein by reference.

BACKGROUND (a) Technical Field

The present disclosure relates to a system and method for periodically charging a sub-battery for an electric vehicle. More particularly, the present disclosure relates to a system and method for periodically charging a sub-battery for an electric vehicle to secure the vehicle startup performance and the sub-battery durability performance through a periodic charging of a sub-battery when a vehicle is left unattended for a long time.

(b) Background Art

Generally, electric vehicles receive a State of Charge (SOC) value of a sub-battery through an Intelligent Battery Sensor (IBS), and set an appropriate level of Low Voltage DC-DC Converter (LDC) output voltage value and then perform charging of the sub-battery. Such electric vehicles require a State of Health (SOH) value of the sub-battery to set the charging frequency and the charging time of the sub-battery. However, since there are many related parameters, such as electronic loads of a vehicle, charging/discharging frequency of the sub-battery, and temperature of the sub-battery, the SOH value of the sub-battery is difficult to accurately measure.

FIG. 1 is a flowchart illustrating a typical periodic charging method of a sub-battery for an electric vehicle. As shown in FIG. 1, the periodic charging method includes executing a preset reservation charging (S100); calculating a SOH value of a sub-battery by checking the internal temperature of the sub-battery, the electronic load of a vehicle, and the charging/discharging frequency of the sub-battery (S110); determining whether or not a SOC value of a main battery is sufficient (S120); requesting for turning-on of a main relay and operation stop of the electronic load when the SOC value of the main battery is sufficient (S130); and charging the sub-battery through an LDC operation (S140) to charge the sub-battery.

In this typical method, since all related parameters, such as the internal temperature of the sub-battery, the electronic load of a vehicle, and the charging/discharging frequency of the sub-battery, need to be measured/checked to calculate the SOH value of the sub-battery, there is a difficulty in calculating an accurate SOH value of the sub-battery, and thus the LDC output voltage value is difficult to appropriately set, causing an increase of the SOC consumption of the main battery.

The above information disclosed in this Background section is only for enhancement of understanding of the background of the disclosure and therefore it may contain information that does not form the related art that is already known to a person of ordinary skill in the art.

SUMMARY OF THE DISCLOSURE

The present disclosure provides a system and method of periodically charging a sub-battery for an electric vehicle, which can efficiently perform periodic charging of the sub-battery by calculating a discharge rate of SOC of the sub-battery through LDC compulsory driving and sub-battery compulsory discharging before the periodic charge of the sub-battery, calculating an accurate SOH value of the sub-battery using the discharge rate and IBS information, and optimally setting the output voltage of an LDC and a battery charge time using the accurate SOH value of the sub-battery.

In one aspect, the present disclosure provides a system and method for periodically charging a sub-battery for an electric vehicle, including: calculating an SOC discharge rate of the sub-battery, setting an LDC output voltage and a charging time of the sub-battery using the SOC discharge rate of the sub-battery and information received from an IBS, determining whether or not an SOC of a main battery is equal to or greater than a set value, and performing periodic charging on the sub-battery through an operation of an LDC when the SOC of the main battery is equal to or greater than the set value.

In an exemplary embodiment, the calculating of the SOC discharge rate may include: charging the sub-battery by forcibly driving the LDC, and discharging the sub-battery into a reference electronic load value. The setting of the LDC output voltage and the charging time of the sub-battery may include: calculating an SOH of the sub-battery using the SOC discharge rate of the sub-battery and the information received from the IBS, and setting the LDC output voltage and the charging time of the sub-battery according to the SOH of the sub-battery.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
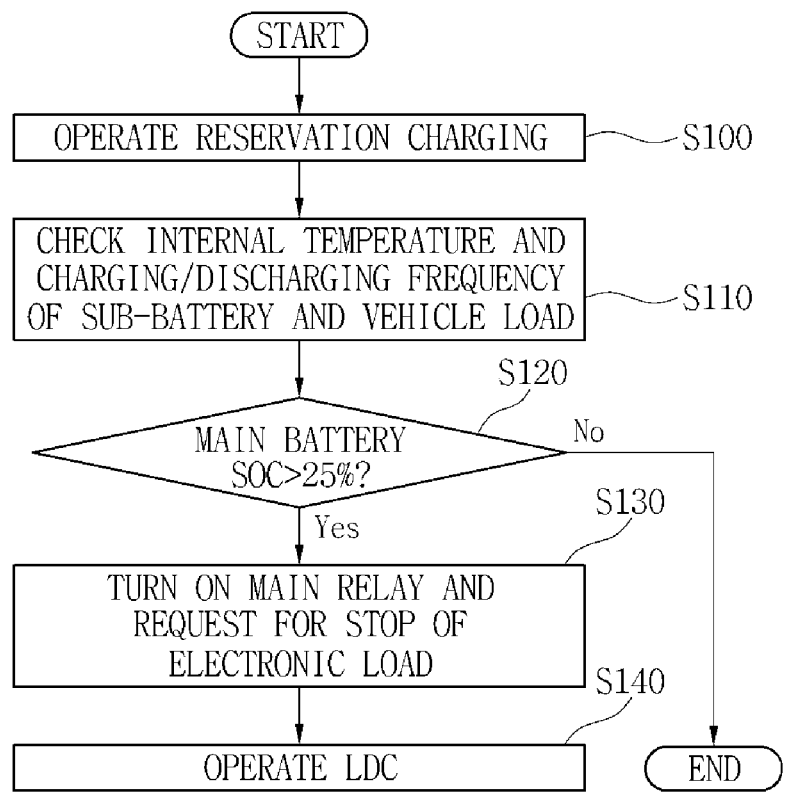
FIG. 1 is flowchart illustrating a typical periodic charging method of a sub-battery for an electric vehicle.

Reference numbers refer to the same or equivalent parts of the present disclosure throughout the figures. It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes, will be determined in part by the particular intended application and use environment.

DETAILED DESCRIPTION

Hereinafter, reference will be made in detail to various embodiments of the present disclosure, examples of which are illustrated in the accompanying drawings and described below. While the contents of the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the embodiments, as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term "controller" refers to a hardware device that includes a memory and a processor. The memory is configured to store program instructions, and the processor is specifically configured to execute said program instructions to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Additionally, it is understood that the below methods are executed by at least one controller. The term controller refers to a hardware device that includes a memory and a processor and is programmable to executed methods below. The memory is configured to store the instructions and the processor is specifically configured to execute said instructions to perform one or more processes which are described further below.

Hereinafter, exemplary embodiments of the present disclosure will be described in detail with reference to the accompanying drawings so that those skilled in the art can easily carry out the contents of the disclosure.

The present disclosure can efficiently perform periodic charging of the sub-battery by calculating a discharge rate of SOC of the sub-battery through LDC compulsory driving and sub-battery compulsory discharging before the periodic charge of the sub-battery, calculating an accurate SOH value of the sub-battery using the discharge rate and IBS information, and optimally setting the output voltage of an LDC and a battery charge time using the accurate SOH value of the sub-battery, and can secure the startup performance of a vehicle and the durability performance of the sub-battery through the periodic charging of the sub-battery.

Figure 2:
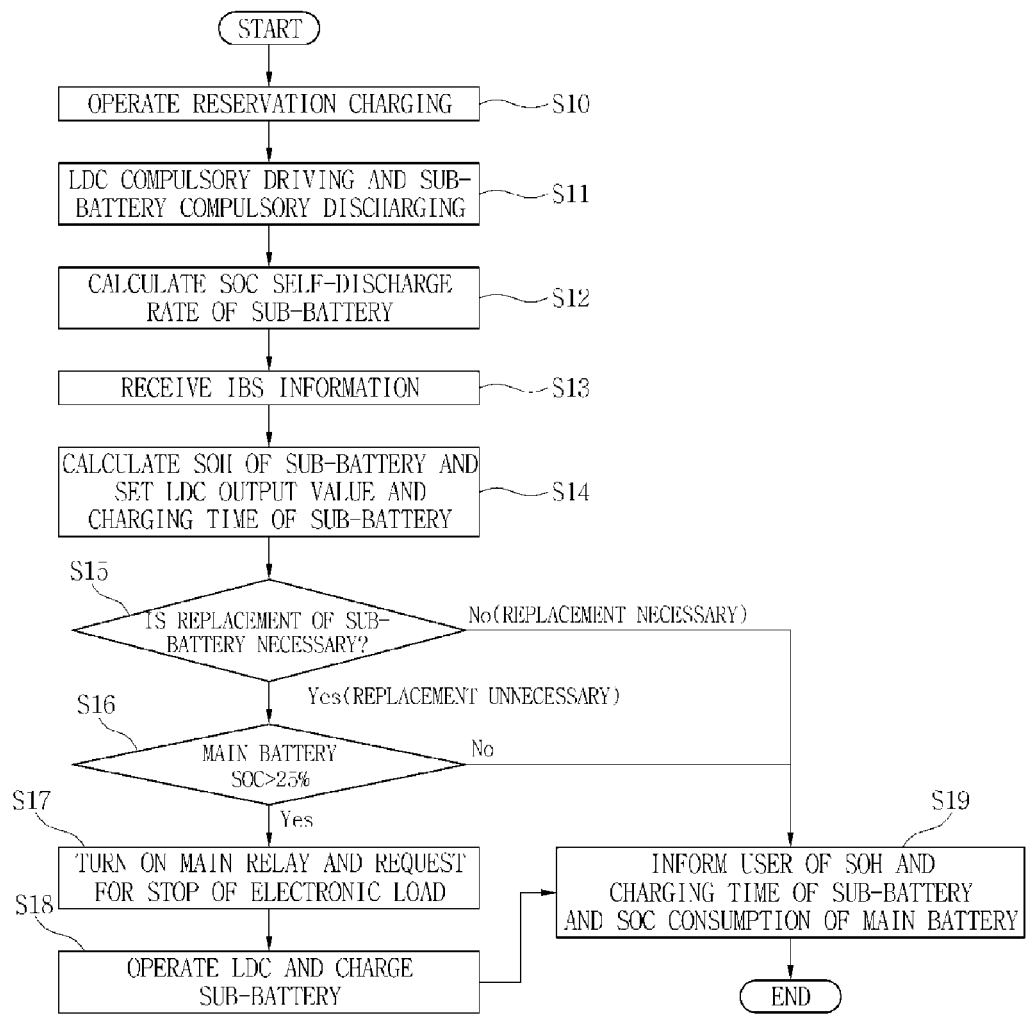
FIG. 2 is a flowchart illustrating a periodic charging method of a sub-battery for an electric vehicle according to an embodiment of the present disclosure.
Figure 3:
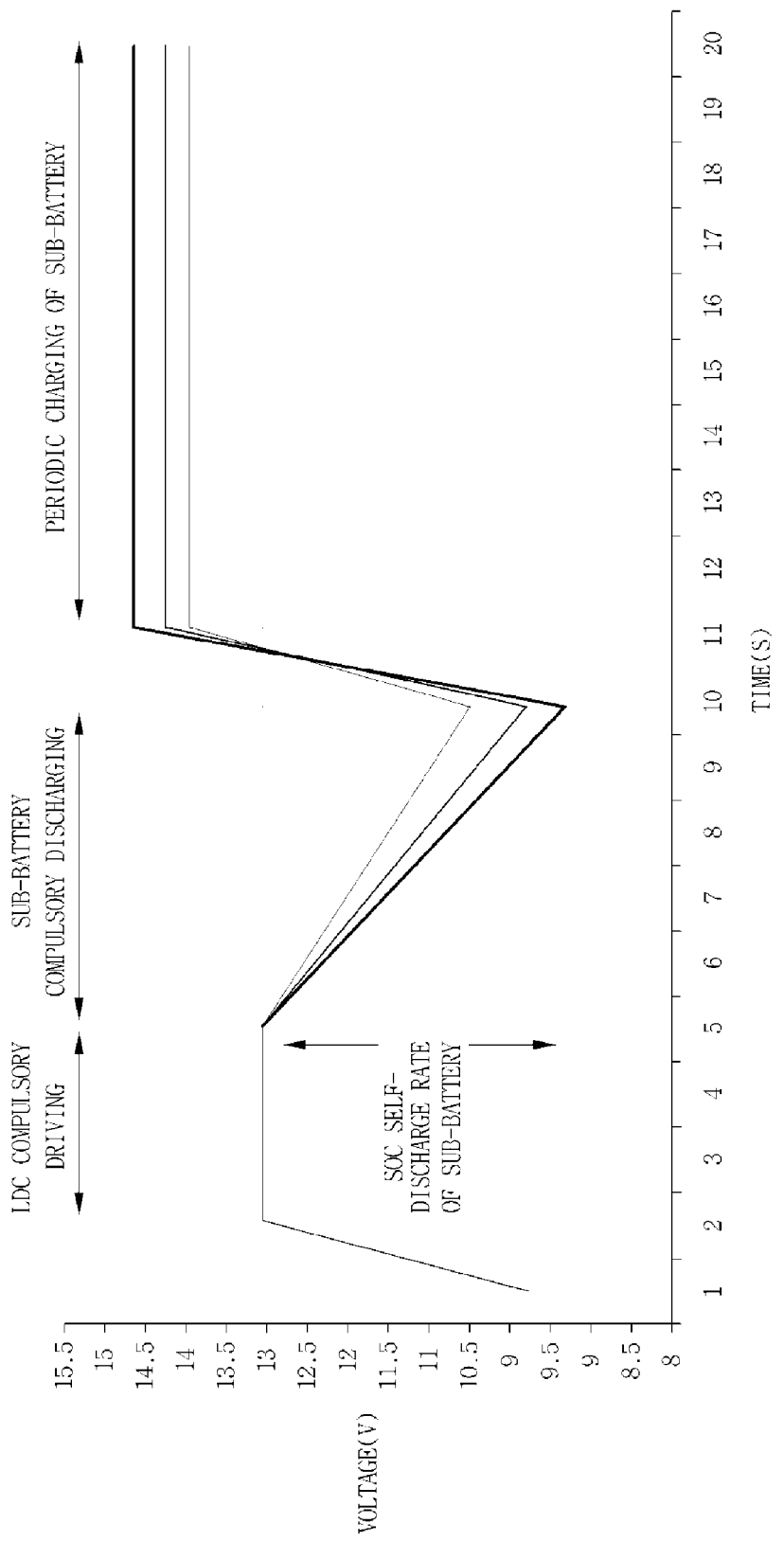
FIG. 3 is a graph illustrating an exemplary voltage change of a sub-battery in a control process according to an embodiment of the present disclosure.

FIG. 2 is a flowchart illustrating a periodic charging method of a sub-battery for an electric vehicle according to an embodiment of the present disclosure. FIG. 3 is a graph illustrating an exemplary voltage change of a sub-battery in a control process according to an embodiment of the present disclosure.

As shown in FIG. 2, a sub-battery may be charged by a preset reservation charging (S10). The reservation charging for the sub-battery at a predetermined time may be set in an in-vehicle controller (taking charge of controlling the reservation charging of the sub-battery). The sub-battery may be charged by the reservation charging, and then the LDC compulsory driving and the sub-battery compulsory discharging may be performed (S11). An LDC controller may forcibly drive an LDC to charge the sub-battery up to a certain SOC value, and then the discharge rate of the SOC of the sub-battery may be calculated by forcibly discharging the sub-battery through a different controller of a vehicle (S12).

The LDC controller may perform the compulsory discharging of the sub-battery through cooperation control with other in-vehicle controllers, e.g., a cluster, a Full Automatic Temperature Control (FATC), and a Vehicle Control Unit (VCU), which performs corresponding control. During the compulsory discharging of the sub-battery, the LDC controller may set a reference electronic load value through the cooperation control with the different controller, and may discharge the sub-battery into a certain load state according to the reference electronic load value (S11). That is, the LDC controller may forcibly discharge the sub-battery charged through the LDC compulsory driving into the reference electronic load value (S11).

The SOC discharge rate of the sub-battery may vary with the electronic load of a vehicle and the internal conditions of the sub-battery. Examples of the internal conditions of the sub-battery may include the internal temperature of the battery and the frequency of charging and discharging. The SOC discharge rate of the sub-battery can be expressed by the below Equation:

$$\text{SOC Self-Discharge Rate} = (\text{Initial SOC of Sub-Battery} - \text{SOC after Compulsory Discharging of Sub-Battery})/\text{Compulsory Discharging Time of Sub-Battery}$$

That is, the SOC discharge rate of the sub-battery can be calculated by dividing a value obtained by subtracting the SOC after the compulsory discharging of the sub-battery from the initial SOC of the sub-battery by the compulsory discharging time of the sub-battery. The initial SOC of the sub-battery may be a SOC value of the sub-battery charged through the compulsory driving of the LDC. Moreover, the reference electronic load can be set as the sum of the vehicle's own load and high electronic loads equipped in a vehicle. Examples of high electronic loads may include a head lamp and a wiper.

As referenced above, the LDC controller may perform cooperation control with different in-vehicle controllers upon control of components other than the LDC, and may perform corresponding information reception and operation control. That is, the periodic charging process of the sub-battery according to this embodiment may be controlled by the LDC controller and other in-vehicle controllers performing cooperation control with the LDC controller.

Meanwhile, the LDC controller may receive sub-battery-related information from an IBS (S13), and then may determine the SOH of the sub-battery using the SOC discharge rate of the sub-battery and the information received from the IBS, i.e., calculate the SOH of the sub-battery. Thereafter, the LDC controller may set the LDC output voltage and the sub-battery charging time (or LDC operation time charging the sub-battery) according to the SOH of the sub-battery (S14), and then may determine whether or not the SOC of a main battery is sufficient to charge the sub-battery (S16). The information received from the IBS may include the internal temperature of the sub-battery, the SOC, a load resistance value detection, and the voltage.

The LDC controller may receive a determination result about the SOC of the main battery through another controller taking charge of the main battery-related control in a vehicle.

The SOC of the main battery may be determined as sufficient when the SOC is equal to or greater than a set value. When the SOC of the main battery is determined as sufficient, the periodic charging operation of the sub-battery may be performed by the LDC operation (S18). In this case, the LDC may generate an output voltage with an input of the voltage of the main battery, and may charge the sub-battery with an output voltage set in the LDC controller for a set charging time.

Since the LDC output voltage and the sub-battery charging time are set to vary with the SOH of the sub-battery, the LDC output voltage may be variably controlled by the LDC controller during the periodic charging of the sub-battery. In this regard, FIG. 3 illustrates an exemplary voltage state of the sub-battery charged into different voltages by the LDC output voltage set according to the SOH of the sub-battery.

After the charging of the sub-battery is completed, the charging time and the SOH of the sub-battery, and the SOC consumption of the main battery due to the periodic charging of the sub-battery may be provided to a driver or a mechanic through a wireless communication, thereby enabling efficient battery management (S19). In addition, the LDC controller may request to turn on a main relay and stop/interrupt an operation of vehicle electronic loads from other in-vehicle controllers (controlling the operation of the main relay and the electronic load) (S17). Thus, accidents due to the operation of the main relay and/or the electronic loads can be prevented. Also, when either the main relay or electronic loads is operating, an indication may be provided to a user through an alarming unit, such as a warning lamp or a warning sound.

Before determining whether or not the SOC of the main battery is sufficient, it can be determined whether or not the sub-battery needs to be replaced (S15). When determining whether or not the sub-battery needs to be replaced, the charging time and the SOH of the sub-battery and the SOC consumption of the main battery due to the periodic charging of the sub-battery may be used. In other words, it is determined whether or not the sub-battery needs to be replaced, by combining information on the time taken to charge the sub-battery through the LDC driving, the SOH of the sub-battery, and the SOC consumption of the main battery used to charge the sub-battery (S15).

When it is determined that the sub-battery needs to be replaced, the charging time and the SOC of the sub-battery, and the SOC consumption of the main battery may be provided to a user such as a driver or a mechanic (S19), enabling efficient battery management. Thus, the periodic charging of the sub-battery can be performed to ensure sufficient vehicle startup performance and sub-battery durability, and to reduce the SOC consumption of the main battery, by calculating an accurate SOH of the sub-battery using the SOC discharge rate of the sub battery and the information from the IBS and setting an optimal LDC output voltage and a charging time of the sub-battery to implement efficient variable voltage control using the LDC controller.

The periodic charging method of a sub-battery for an electric vehicle, as described herein, has at least the following advantages, as would be recognized by a person of ordinary skill in the art in view of the present disclosure.

1. The startup performance of a vehicle and the durability performance of a sub-battery can be secured through the periodic charging of the sub-battery when the vehicle is left unattended for a long time. For example, discharging of the sub-battery due to an increase of private electronic parts such as a black box, i.e., the increase of a vehicle dark current, can be prevented, and the durability performance of the sub-battery can be improved due to a reduction of a deep discharge.

2. Since the LDC output voltage and the sub-battery charge time is determined according to the SOH of the sub-battery, an efficient charge of the sub-battery is enabled through efficient variable voltage control by an LDC controller. Thus, the SOC consumption of a main battery can be reduced.

3. Since a SOC discharge rate of the sub-battery is calculated from the LDC compulsory driving and the sub-battery compulsory discharging, and the SOH of the sub-battery is calculated from the SOC discharge rate, the accuracy regarding the SOH of the sub-battery can be improved. Thus, the LDC output voltage and the battery charge time can be appropriately set according to the SOH of the sub-battery.

4. The SOH and charge time of the sub-battery and the SOC consumption of the main battery after the charging of the sub-battery can be provided to a driver or a mechanic through a wireless communication to efficiently manage the battery.

5. The connection (On-state) of a main relay, or the operation of the electronic load, before the charging of the sub-battery can be provided to a driver or a mechanic through an alarm or a warning to prevent accidents.

In the alternative, aspects of the periodic charging method of a sub-battery for an electric vehicle, as described herein, may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The contents of the present disclosure have been described in detail with reference to exemplary embodiments thereof. However, it will be appreciated by those skilled in the art that changes may be made in these embodiments without departing from the principles and spirit of the embodiments, the scope of which is defined in the appended claims and their equivalents.

What is claimed is:

1. A method for periodically charging a sub-battery for an electric vehicle, consisting of:
   a first step of calculating, by a controller, a State of Charge (SOC) discharge rate of the sub-battery after charging the sub-battery by compulsory driving a Low Voltage DC-DC Converter (LDC) and discharging the sub-battery, which has been charged by the compulsory driving of the LDC, into a reference electronic load value;
   thereafter, a second step of setting, by the controller, the LDC output voltage and a charging time of the sub-battery using the SOC discharge rate of the sub-battery and information received from an Intelligent Battery Sensor (IBS);
   a third step of determining, by the controller, whether or not an SOC of a main battery is equal to or greater than a set value; and then
   a fourth step of performing, by the controller, periodic charging of the sub-battery through an operation of an LDC when the SOC of the main battery is equal to or greater than the set value.

2. The method of claim 1, wherein the SOC discharge rate of the sub-battery is calculated from the Equation below:

SOC Discharge Rate=(Initial SOC of Sub-Battery−
SOC after Compulsory Discharging of Sub-Battery)/Compulsory Discharging Time of Sub-Battery, wherein the initial SOC of the sub-battery is an SOC value of the sub-battery charged through the compulsory driving of the LDC.

3. The method of claim 1, wherein the reference electronic load value is a sum of a vehicle's own load.

4. The method of claim 1, wherein the compulsory driving of the LDC is performed after a reservation charging operation for charging the sub-battery at a predetermined time.

5. The method of claim 1, further consisting of: stopping an operation of an in-vehicle main relay and electronic load before the periodic charging of the sub-battery is performed.

6. The method of claim 1, further consisting of: informing a user by an alarming unit when either an in-vehicle main relay or an electronic load operates before the periodic charging of the sub-battery is performed.

7. The method of claim 1, wherein the setting of the LDC output voltage and the charging time of the sub-battery comprises:

calculating a State of Health (SOH) of the sub-battery using the SOC self-discharge rate of the sub-battery and the information received from the IBS; and setting the LDC output voltage and the charging time of the sub-battery according to the SOH of the sub-battery.

8. The method of claim 1, wherein the information received from the IBS comprises at least one of an internal temperature and an SOC of the sub-battery, a load resistance value detection, and a voltage.

9. The method of claim 1, further consisting of: determining whether or not the sub-battery needs to be replaced after the setting of the LDC output voltage and the charging time of the sub-battery.

10. The method of claim 9, wherein the determining of whether or not the sub-battery needs to be replaced comprises using the charging time and an SOH of the sub-battery, and a consumption of the main battery due to the periodic charging of the sub-battery.

11. The method of claim 9, wherein when it is determined that the sub-battery needs to be replaced, further comprising informing a user of the charging time and an SOH of the sub-battery, and a consumption of the main battery due to the periodic charging of the sub-battery.

* * * * *